United States Patent
Joseph et al.

(10) Patent No.: US 12,541,408 B2
(45) Date of Patent: Feb. 3, 2026

(54) OPTIMIZED DYNAMIC LARGE SCALE AND LARGE DOCUMENT INGESTION FOR SEARCH ENGINES USING SERVICE MESH

(71) Applicant: Cisco Technology, Inc., San Jose, CA (US)

(72) Inventors: Sujith Joseph, San Jose, CA (US); Praveen Kumar Kalakuntla, Secunderabad (IN); Shalini Gupta, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 18/199,517

(22) Filed: May 19, 2023

(65) Prior Publication Data
US 2024/0385900 A1 Nov. 21, 2024

(51) Int. Cl.
*G06F 9/50* (2006.01)
*G06F 16/13* (2019.01)

(52) U.S. Cl.
CPC .......... *G06F 9/5083* (2013.01); *G06F 9/5044* (2013.01); *G06F 9/5072* (2013.01); *G06F 16/134* (2019.01)

(58) Field of Classification Search
CPC .................................................. G06F 9/5072
See application file for complete search history.

(56) References Cited

U.S. PATENT DOCUMENTS

| | | | |
|---|---|---|---|
| 11,405,451 B2 | 8/2022 | Pinheiro et al. | |
| 11,468,193 B2 | 10/2022 | Lu et al. | |
| 11,573,867 B2 | 2/2023 | Rhodes et al. | |
| 2002/0065979 A1* | 5/2002 | Chauvel | G06F 12/084 711/E12.039 |
| 2021/0064708 A1 | 3/2021 | Dellinger et al. | |
| 2023/0205593 A1* | 6/2023 | Goksen | G06F 9/5033 718/104 |

OTHER PUBLICATIONS

Chaturvedi, Animesh, "Large Scale Data Ingestion Using Istio/Envoy", online: https://events.istio.io/istiocon-2021/slides/c5a-LargeScaleDataIngestion-Animesh.pdf, accessed Apr. 20, 2023, 19 pages, IstioCon.
"Best practices for running cost-optimized Kubernetes applications on GKE", online: https://cloud.google.com/architecture/best-practices-for-running-cost-effective-kubernetes-applications-on-gke, accessed Jun. 6, 2022, 36 pages.
"Building a multi-cluster service mesh on GKE using multi-primary control-plane multi-network architecture", online: https://cloud.google.com/architecture/building-a-multi-cluster-service-mesh-on-gke-using-replicated-control-plane-architecture, accessed Jun. 6, 2022, 21 pages.

* cited by examiner

*Primary Examiner* — Charlie Sun
(74) *Attorney, Agent, or Firm* — Lee & Hayes, P.C.

(57) ABSTRACT

In one embodiment, an illustrative method herein comprises: obtaining, by a process, a file having a given size; assigning, by the process, the file to a particular size-range bucket of a plurality of size-range buckets of a data ingestion pipeline, the plurality of size-range buckets having a corresponding size-based configuration; and forwarding, by the process, the file into a particular size-based service mesh ingress gateway of the data ingestion pipeline according to the particular size-range bucket to cause processing of the file within the data ingestion pipeline according to the corresponding size-based configuration of the particular size-range bucket.

20 Claims, 9 Drawing Sheets

OPTIMIZED DYNAMIC LARGE SCALE AND LARGE DOCUMENT INGESTION FOR SEARCH ENGINES USING SERVICE MESH

TECHNICAL FIELD

The present disclosure relates generally to computer systems, and, more particularly, to optimized dynamic large scale and large document ingestion for search engines using service mesh.

BACKGROUND

Search engine technology has advanced greatly since its inception. While certain search engines are typically based on scouring large amounts of smaller references (e.g., documents or websites, etc.), other environments, in particular, have different needs, such as much larger references or specific types of references. For example, enterprises need an enterprise-specific search engine to find valuable information across the enterprise searchable for its employees. The data in an enterprise includes documents or other references that are created by its employees, and may include such things as, e.g., knowledge articles, database records, product information (e.g., installation manuals, operation manuals, support cases, product bug data, product bug attachments, etc.). This data needs to be indexed into an enterprise search engine to be available for its findability by employees. This data can be pushed to the enterprise search engine via data source connectors which will pull the data from the data source and send it to the search engine for indexing. Indexing is the process by which the search engine converts the text in these documents into token lists/formats that the enterprise search engine can use for keyword searches. There are, however, challenges in building an enterprise search engine due to its specific environment, such as its dependency on cloud storage, the large size of documents, and so on.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein comprises: obtaining, by a process, a file having a given size; assigning, by the process, the file to a particular size-range bucket of a plurality of size-range buckets of a data ingestion pipeline, the plurality of size-range buckets having a corresponding size-based configuration; and forwarding, by the process, the file into a particular size-based service mesh ingress gateway of the data ingestion pipeline according to the particular size-range bucket to cause processing of the file within the data ingestion pipeline according to the corresponding size-based configuration of the particular size-range bucket.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
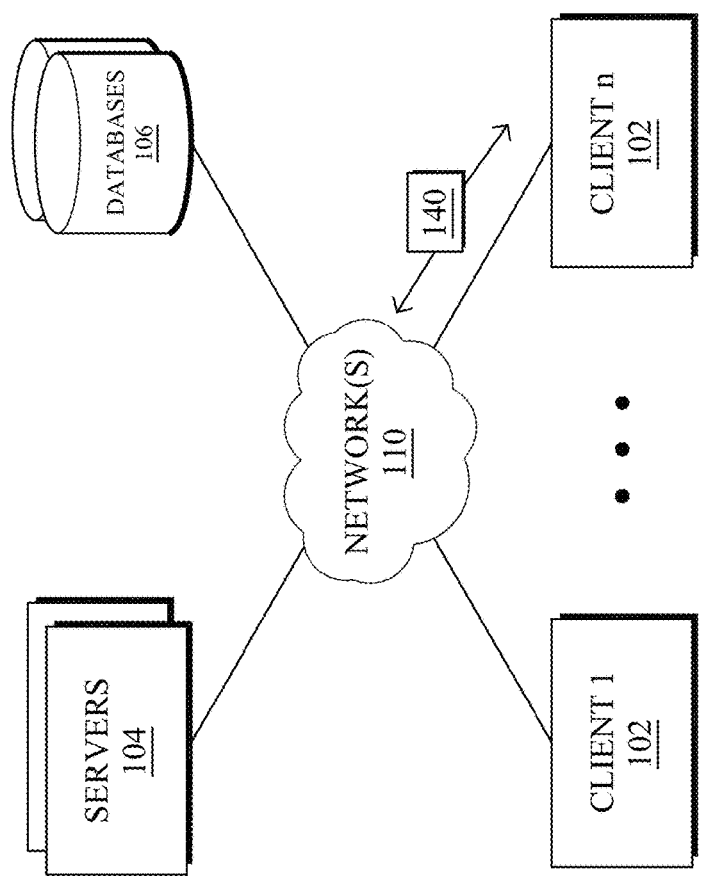
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
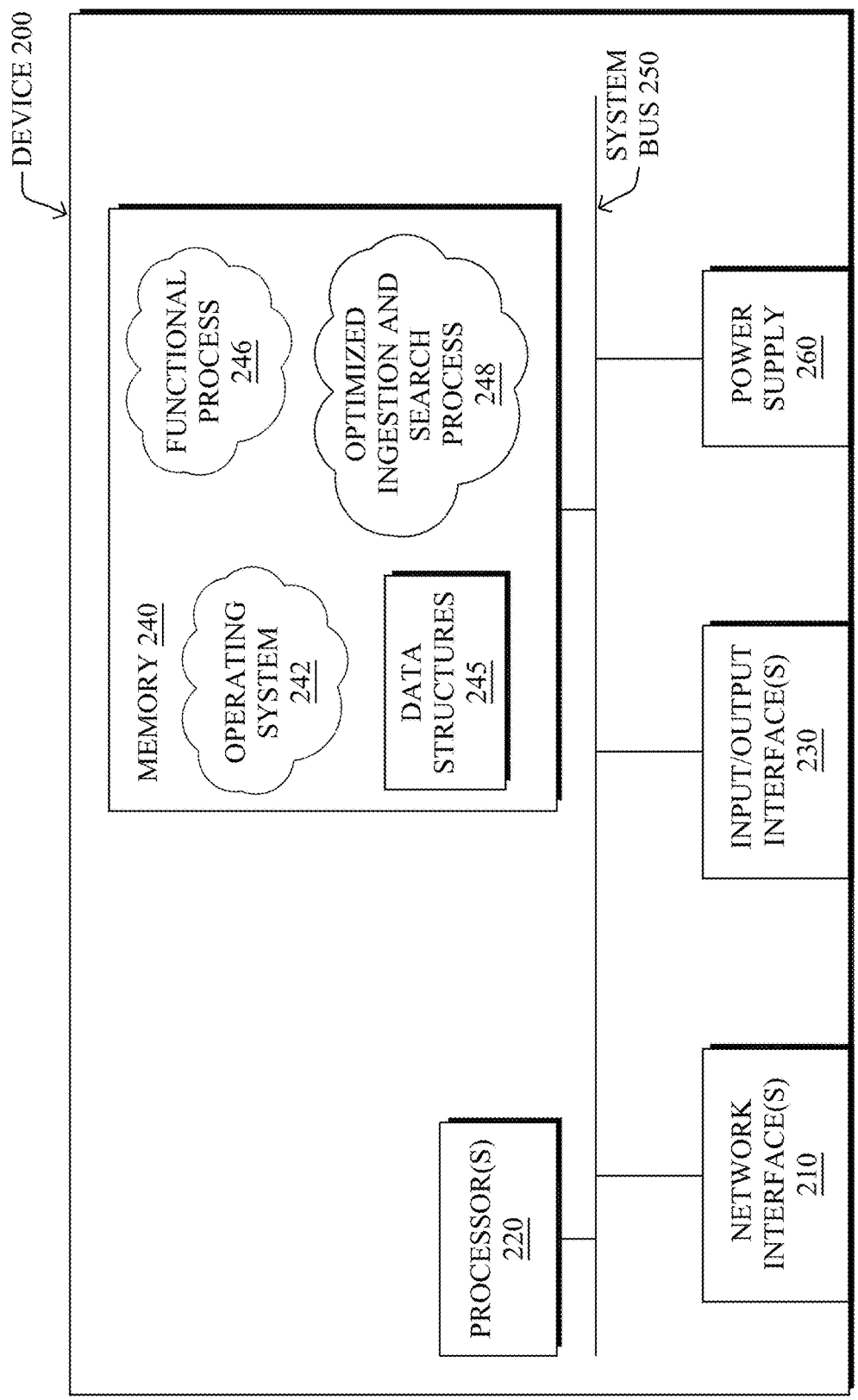
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "optimized ingestion and search" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Large Scale and Large Document Ingestion for Search Engines Using Service Mesh—

As noted above, enterprises (or other entities/organizations/etc.) need an enterprise-specific search engine to find valuable information across the enterprise searchable for its employees (e.g., from knowledge articles, database records, product information, and so on). As also noted above, this data needs to be indexed into an enterprise search engine to be available for its findability by employees, but there are challenges in building an enterprise search engine due to its specific environment. For instance, building an enterprise search engine using a distributed search and analytics engine (such as, e.g., Elasticsearch) running as microservices in a containerized cloud environment (e.g., Kubernetes, such as Google Kubernetes Engine) and other cloud platform services can have a number of specific issues.

First, there is often a challenge of network timeout for large document ingestion for Elasticsearch and imbalanced distribution of ingestion load in Elasticsearch search engine. In particular, the Elasticsearch engine may time out frequently with the ingestion of batches of large documents or even a single large document causing blockage of indexing, stalling the entire document ingestion pipeline in the ingestion microservice. For the purpose of the present disclosure, an example of a large document is a document greater than, e.g., 50 MB of pure text. A good example of such large document may be product bug attachments and combined product bug enclosure notes. The ingestion microservice used in an example enterprise search engine is a server-side data processing pipeline (e.g., that ingests data from multiple sources simultaneously, transforms it, and then sends it to a "stash" like Elasticsearch), such as, e.g., a Logstash microservice, which has the ability to send textual documents to an Elasticsearch endpoint.

In an example enterprise search implementation, for instance, assume that an Elasticsearch endpoint is Elasticsearch data nodes microservices exposed as a cloud platform internal TCP/UDP Load Balancer. The network idle timeout settings for this load balancer has limitations in terms of configuration, as it only works with 'Session/IP' affinity, which causes all the ingestion requests to Elasticsearch to be only load balanced to a few Elasticsearch data nodes, instead of the hundreds of data nodes that the system has. Some of the issues faced in this situation, therefore, are results such as, for example:

Elasticsearch Unreachable or Down;
Node Not Connected;
Failed Actions, Attempts, and Retries;
Rejected Requests;
and so on.

Worse still, for each failed batch of documents, Logstash retries the request three times, further utilizing other worker threads of Logstash and delaying/stalling the entire ingestion.

The reason for the timeout for large documents is due to the huge time taken by Elasticsearch to process the large document batches, which is again is due to the large number of unique tokens seen in these documents like product bug attachments/notes.

A second issue is when ingestion microservices crash due to stalled threads, as all Logstash connections that are exhausted waiting for Elasticsearch endpoint responses when processing large documents. For instance, errors that may be seen with stalled threads in Logstash may be such things as:

Pipeline Terminated;
Logstash Shut Down;
Stalled Thread;
Etc.

Still another issue is the usage of 'one size fits all' ingestion microservice settings and configurations, which lead to poor ingestion performance. That is, the Logstash microservice and its replicas receive documents in different documents in different sizes, even from the same data source like product bugs. They are in different size ranges: <5 KB, some are <1 MB, <10 MB, <50 MB, <100 MB, etc. The Logstash microservice receives these documents as messages in a Pub/Sub (publish/subscribe) messaging stream with each message containing a cloud storage URL for the document to be downloaded by Logstash and sent to Elasticsearch for indexing. Two specific challenges present themselves with respect to large documents here:

1. The memory settings for Logstash microservices had to be very large (e.g., greater than 5 GB) to accommodate for the large files which had to be downloaded and sent to Elasticsearch for ingestion. Otherwise it led to 'Out of Memory' errors for Logstash and it would get shut down during processing. With larger numbers of replicas of Logstash, this would incur higher costs for an enterprise, due to a large memory footprint for ingestion microservices.
2. The batch size for large documents in Logstash had to be smaller along with a lower number of worker threads in order to avoid Out of Memory errors. If the batch size is small, then the ingestion rate to Elasticsearch will be very low as well, creating a large bottleneck of ingestion events in ingestion pipeline.

In some cases, such as product bug enclosure notes, custom ingestion microservices can be used in pre-processing and aggregating the individual notes, before indexing it into Elasticsearch engine. Bugs with a larger number of enclosures (e.g., greater than 2000) require much higher CPU specifications, whereas some bugs which had a smaller number of enclosures only need fewer CPU cores.

Ultimately, there is no "one size fits all" configuration that can lead to an optimum ingestion performance for the ingestion microservice for an example enterprise search engine, while keeping the costs as low as possible.

A still further issue is that there is no real-time observability on the document ingestion process in order to be able to diagnose issues. That is, when faced with issues in large document ingestion, there is currently no (or limited) insight into why the issues are happening. In particular, there is currently no observability layer in the system, which would help in diagnosing issues faster, or simply at all.

In light of the problems noted above, the techniques herein, therefore, provide for an optimized dynamic large scale and large document ingestion for search engines using service mesh. In particular, the embodiments described in greater detail below provide a highly scalable, dynamic content ingestion along with support for large document ingestion for an enterprise search engine utilizing the best features of a service mesh in a Kubernetes cluster.

Specifically, according to one or more embodiments described herein, an illustrative method herein comprises: obtaining, by a process, a file having a given size; assigning, by the process, the file to a particular size-range bucket of a plurality of size-range buckets of a data ingestion pipeline, the plurality of size-range buckets having a corresponding size-based configuration; and forwarding, by the process, the file into a particular size-based service mesh ingress gateway of the data ingestion pipeline according to the particular size-range bucket to cause processing of the file within the data ingestion pipeline according to the corresponding size-based configuration of the particular size-range bucket.

Operationally, and with reference to FIG. 3, to address the challenges listed above, the techniques herein may illustratively comprise the following high-level steps of process 300, described in detail further below:

1. Step 305: Separate custom ingestion pipelines utilizing Kubernetes microservices to handle pre-processing of files with different size range buckets;
2. Step 310: Separate Logstash Kubernetes services with optimal/custom configurations for each of the size range buckets for optimal ingestion performance; and
3. Step 315: Separate ServiceMesh (e.g., Istio) ingress gateways along with a corresponding cloud platform (e.g., GCP) internal HTTPS load balancer for Elasticsearch for each of the size range buckets with different timeout configurations with the ability to visualize the traffic from an observability standpoint.

Figure 4:
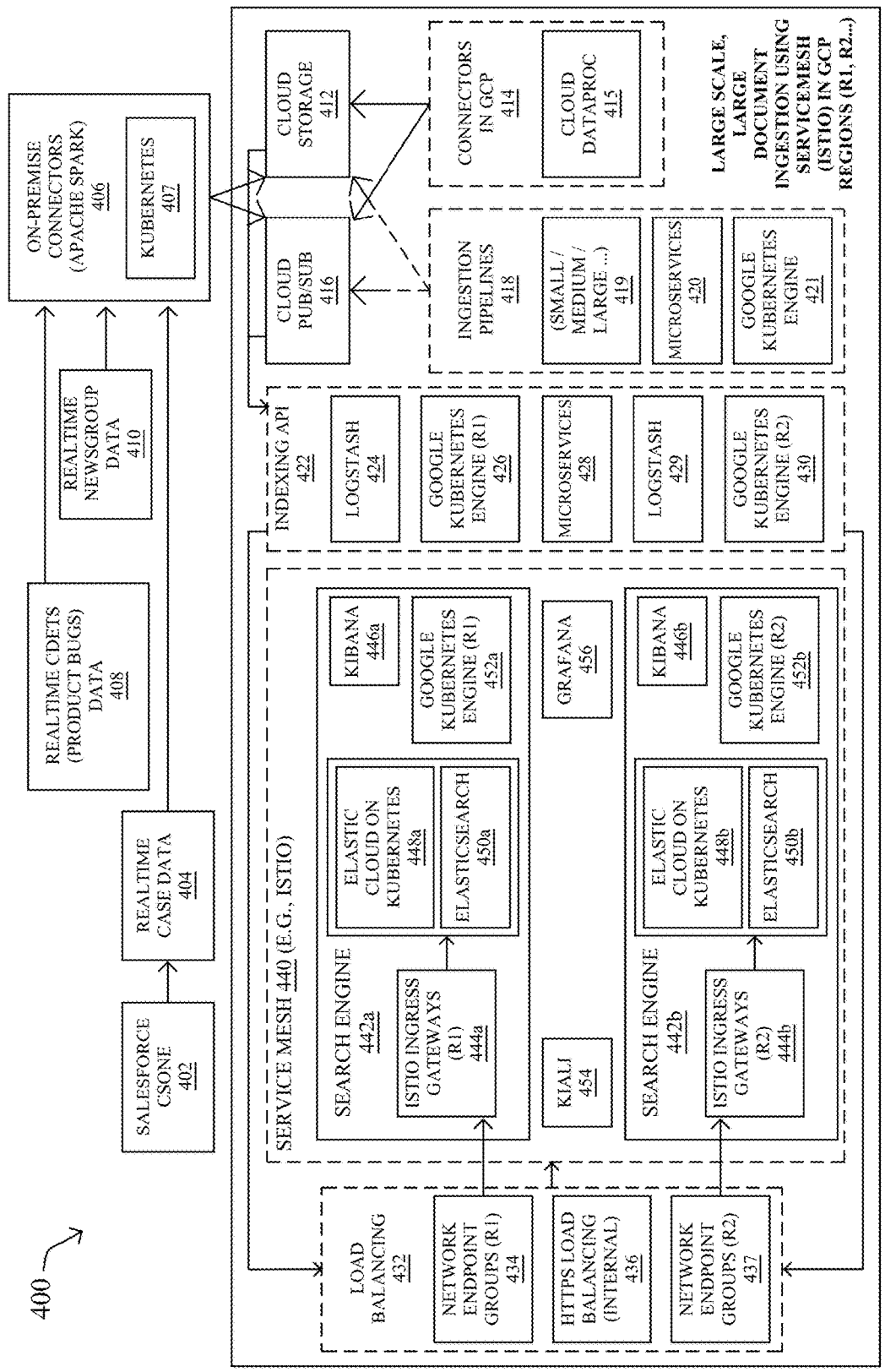
FIG. 4 illustrates an example of an architecture for optimized dynamic large scale and large document ingestion for search engines using service mesh in accordance with one or more embodiments described herein.

FIG. 4 illustrates example of an architecture 400 for optimized dynamic large scale and large document ingestion for search engines using service mesh in accordance with one or more embodiments described herein. Notably, while certain known products have been identified by their respective names, those skilled in the art will appreciate that any suitable application/product/software may be used within the architecture, and that those shown are merely representative examples of a configured system operating according to the techniques herein.

In particular, as shown in FIG. 4, and as described in greater detail below, the architecture 400 comprises various example inputs into the platform, such as customer relationship management software (e.g., Salesforce) 402 which inputs into realtime case data 404. On-premise connectors 406 (e.g., Apache Spark) may have a Kubernetes instance 407, which together can produce realtime product bugs data 408 and realtime newsgroup data 410.

Within the cloud platform, cloud storage component 412 receives inputs from the on-premise connectors 406 as well as connectors 414 within the cloud platform (e.g., based on cloud data processing 415). A cloud pub/sub component 416 receives input from ingestion pipeline 418 (which also provides data to cloud storage component 412), where the ingestion pipelines have small/medium/large buckets 419 as described herein, and various microservices 420, a Kubernetes engine 421 is also found within the ingestion pipeline 418, accordingly.

Cloud storage 412 and cloud pub/sub 416 pass files (documents, data, etc.) to an indexing API 422, which has regional instances of Kubernetes engines 426 (region "R1") and 430 (region "R2"), and corresponding Logstash instances 424 (R1) and 429 (R2), accordingly. Indexing API 422 also has various microservices 428 as well.

The indexing API transfers the files/data to the load balancing operations 432, which has corresponding network endpoint groups 434 (for R1) and 437 (for R2) and an HTTP load balancing process 436. According to the appropriate forwarding of the files, the service mesh 440 has separate (regional) instances of search engines 442 (a and b), each with an Istio ingress gateway 444 (a and b), Elastic Cloud instances 448 (a and b) with Elasticsearch instances 450 (a and b) and a corresponding Kubernetes engine (a and b) such as a Google Kubernetes Engine (GKE), with all data being visualized by a visualization software instance 446 (a and b) such as Kibana. Management of the service mesh may be performed through management console 454 for Istio service mesh, such as Kiali, while dashboard management 456 of an observability platform for the infrastructure may be provided by such applications as Grafana.

Figure 3:
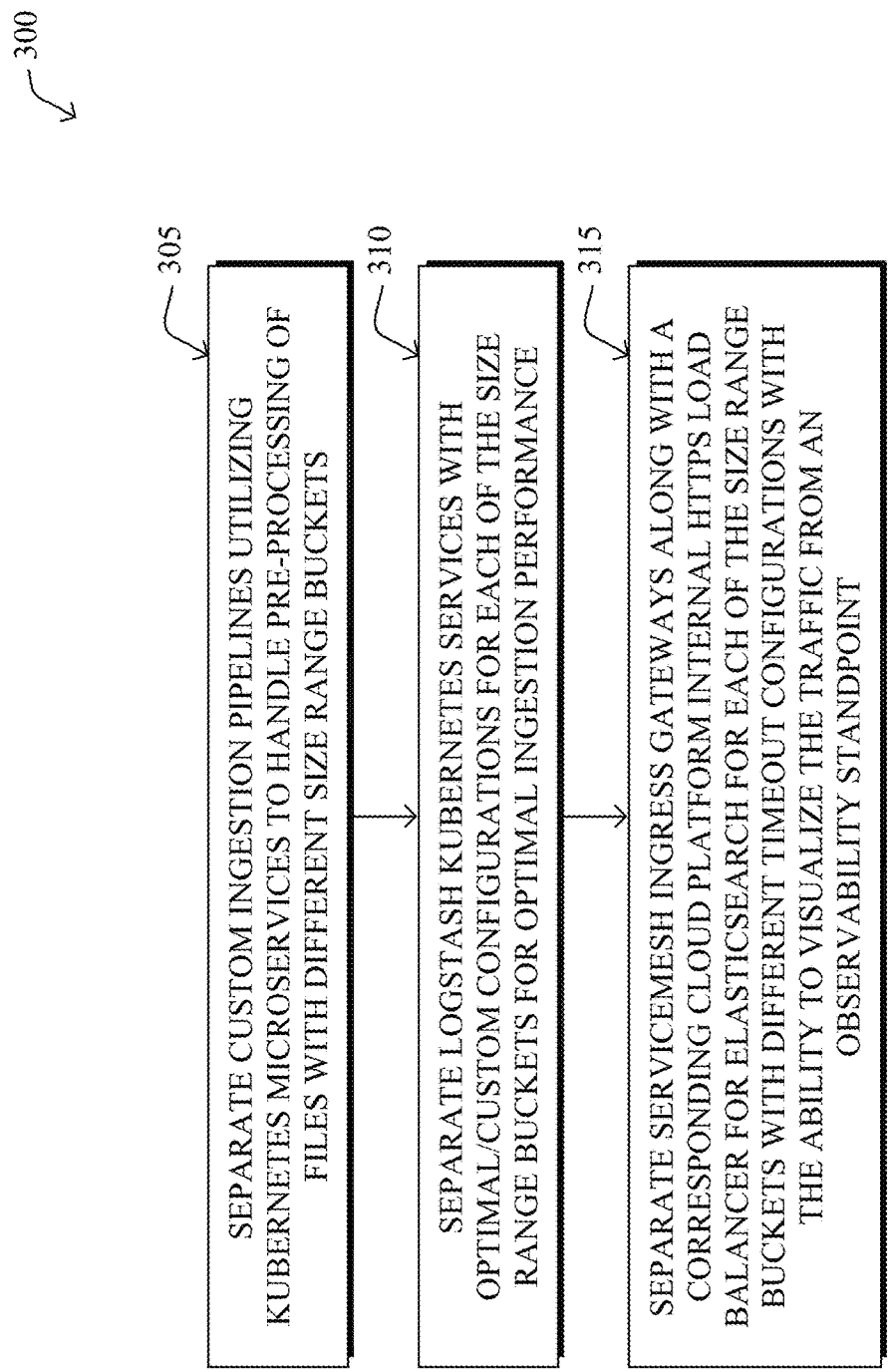
FIG. 3 illustrates an example of high-level steps of optimized dynamic large scale and large document ingestion for search engines using service mesh in accordance with one or more embodiments described herein.

According to one or more embodiments of the present disclosure, the following discussion provides greater detail than the high-level process 300 described in FIG. 3 above, with reference generally to the illustrative architecture 400 of FIG. 4. Namely, documents or other files or filetypes for ingestion may be annotated for its size range bucket as an attribute of a Cloud Platform Pub/Sub Message for that file/document, such as by a custom microservice, and is pushed into a Pub/Sub Messaging Topic. Notably, Multiple Cloud Platform Pub/Sub Topic subscriptions may be created with custom filters for each of these size range bucket annotations, for the above Pub/Sub Topics.

Custom Kubernetes microservice deployments for multiple ingestion pipelines may be created for each of the above Pub/Sub Topic subscriptions which may be configured to perform pre-processing of the documents for ingestion. Pre-processing of the documents also includes aggregations/combination of individual sub-document/notes from Cloud Storage buckets. Each of these microservices may have different processing (e.g., CPU) and memory (e.g., RAM) specifications and different KUBERNETES POD REPLICAS/HORIZONTAL POD AUTOSCALER (HPA) configurations based on the size ranges of the incoming documents, which will auto-scale based on the increased volume of ingestion of documents as well. For example, a document of size <1 MB, will have smaller CPU/RAM specification for the ingestion microservice pipeline. The HPA specification for it would be much larger (minimum replicas as 2, maximum as 200), as there are a larger number of documents which falls into this bucket.

Generally, the HPA settings will allow for the microservice pods to auto-scale up and down, based on the volume of documents flowing through the system, thus enabling an efficient utilization of cloud compute (CPU/RAM) resources and thereby optimizing the cost. Each of these microservices push the processed documents into Cloud Storage objects and reference of it (e.g., a cloud storage url of the document), along with essential metadata about the doc like index name, document ID, etc. is sent as a message to its own Pub/Sub Topic (one per size range bucket). Each of these Pub/Sub Topic has two Pub/Sub Topic subscriptions. These subscriptions are consumed by different Logstash microservice instances running in different Kubernetes clusters running in different cloud platform regions (e.g., us-east1 and asia-southeast1), as detailed in the step below.

The custom microservice also illustratively sends events to a dedicated Pub/Sub topic for traceability/error reporting for each document that flows through Logstash along with its document ID and url, POD Name, processing time, current time, success/failure status etc. This data is indexed into the dedicated Elasticsearch index (referenced in above step) in a dedicated Elasticsearch cluster/microservice running in a Kubernetes engine and in a data warehouse to generate a report on ingestion statistics and create error alerts. The error messages in pub/sub for these events has a "CRITICALITY RATING" assigned based on the type of event. This rating is used to determine, the set of error messages will trigger alerts, such as in Cisco Webex Teams, email, SMS, etc., via a cloud platform functionality.

For each cloud platform Pub/Sub Topic subscription listed above (per size range bucket), there is set of dedicated Logstash microservices, with its own specific and optimal configurations for CPU, RAM, document batch size/number of documents in batch, timeout, worker threads and HPA (horizontal pod auto-scaler) settings. For example, for >100 MB size group, it may illustratively have lower number of documents in a batch (say 5), with only single worker thread, but much higher RAM (to avoid Out of Memory errors), with a larger timeout (say 1-2 hours) with HPA settings (minimum as 2, max as 20). For <25 KB size group, it may illustratively have much larger number of documents in a batch (say 10000), with say only 4 worker thread (based on CPU cores), but much lower RAM (to be cost/resource effective), with HPA settings (minimum as 2, max as 200).

The Logstash microservice does the job of downloading the document from its cloud storage url via a custom plugin and publishes it to the Elasticsearch endpoint for indexing. The custom plugin also sends events to a dedicated Pub/Sub topic for traceability/error reporting for each document that flows through Logstash along with its document ID and GCS url, processing time, current time, success/failure status etc. This data is also indexed into the dedicated Elasticsearch index (referenced in above step) in a dedicated Elasticsearch cluster/microservice running in the Kubernetes engine and in the data warehouse to generate report on ingestion statistics and create error alerts. Each of these Logstash instances (per each size group bucket) will have specific cloud platform HTTPS Load balancer (Internal) as an Elasticsearch endpoint. Notably, there may be a set of dedicated Logstash microservices instances to handle deletion of documents as well. The HPA settings on the Logstash microservices will ensure that they auto-scale up/down based on the volume of documents that flows in to the system.

Illustratively, the entire ingestion system (except for Elasticsearch microservices) may be hosted in a dedicated Kubernetes cluster (e.g., a Kubernetes Engine) in a specific region, e.g., "us-east1". The Logstash microservices set may be duplicated in different Kubernetes clusters running in a different cloud platform regions (e.g., asia-southeast1) to perform 'local' indexing of this data into an Elasticsearch search engine running in that cloud platform region. This enables Global Resiliency for an enterprise search. Logstash may also have configurations stored in ConfigMaps of a Kubernetes engine. The credentials to authenticate against Elasticsearch may be stored in a cloud platform Secret Manager and may be synced to a namespace hosting Logstash microservices as Kubernetes engine secrets. Logstash microservice may load these secrets in its configurations to be used during ingestion.

The search sub-system set of microservices may be hosted in a dedicated Regional Kubernetes cluster, which may be hosted in two cloud platform regions (e.g., "us-east1" and "asia-southeast1") across the globe. It can be extended to any number of cloud platform regions across the globe. The search and indexing subsystem may be hosted in different Kubernetes clusters in each cloud platform region for resiliency and stability, as well as for scalability and security purposes. This also allows for ingestion set of microservices to be scaled up without having any impact to Search Kubernetes engine cluster level configuration limits like DNS/networking level limits like number of Pods per Node, number of nodes (based on subnet range set for the cluster), etc. This also ensures that a large spike in cloud platform API's invoked by the microservices in ingest cluster, which in turn triggers a spike in Kubernetes engine meta-data service instances created (based on HPA) with Workload Identity enabled Kubernetes engine clusters, doesn't impact any search side microservices impacting end users of search application. Notably, from testing, cloud platform APIs with >20,000 requests per second causes latencies and timeouts to cloud platform API calls, if used with Workload Identity. The search subsystem hosts the Elasticsearch clusters. The Elasticsearch clusters in each cloud platform region and its endpoints are exposed to the Logstash instances from the above step via a Service Mesh.

The techniques herein may use Istio as the service mesh framework. For every Logstash microservices set (for each of the size range buckets), there exists a dedicated ISTIO ingressgateway with its own HPA settings and TLS encryption in the service mesh. Istio Virtual services are created for each such ingressgateway with custom settings for timeouts, retries, destination rules, etc., to route to the Elasticsearch ingest node microservices. Custom Kubernetes engine services may be created to route the traffic to the Elasticsearch ingest nodes alone. This will allow resiliency for ingestion to Elasticsearch. The istio ingressgateways are annotated with cloud platform Network Endpoint Group (NEG) annotation to serve as backends for cloud platform internal HTTPS loadbalancer (Regional) (for each of the size range buckets). The service mesh (istio) captures observability of the traffic that flows from Logstash to Elasticsearch nodes, via the istio ingressgateways. Illustratively, the techniques herein may capture the istio custom metrics and visualize them via a user interface (UI) dashboard in various applications, which may be running as microservices in the same Kubernetes engine Cluster. The following metrics may be visualized according to the techniques herein:

The size of the documents that came in for ingestion;
Realtime incoming request duration for connections for document ingestion;
Responses from Elasticsearch servers and their HTTP Codes (e.g., 2xx, 5xx, 4xx . . . ) in real time for document ingestion;
Realtime incoming request volume (ingestion rate for document ingestion);
Realtime requests percentage distribution, average response time for requests, requests per second across microservices, and Elasticsearch nodes for document ingestion;
Realtime alerting for errors for downtime for Elasticsearch endpoints or errors during large ingestion into Elasticsearch or integration into an alerting system.

Regarding alerting, such as for the cloud platform internal https load balancers in the above step, monitoring uptime checks are configured to check against Elasticsearch clusters along with alert integration with an alerting system, in case of issues related to ingestion to Elasticsearch.

Figure 5A:
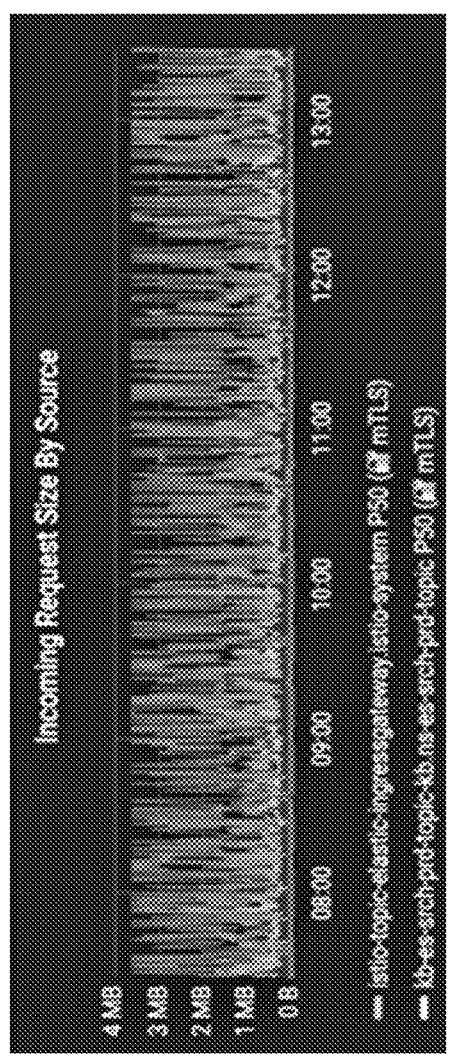
FIGS. 5A-5D illustrate examples of user interfaces based on observability data for optimized dynamic large scale and large document ingestion for search engines using service mesh in accordance with one or more embodiments described herein.
Figure 5B:
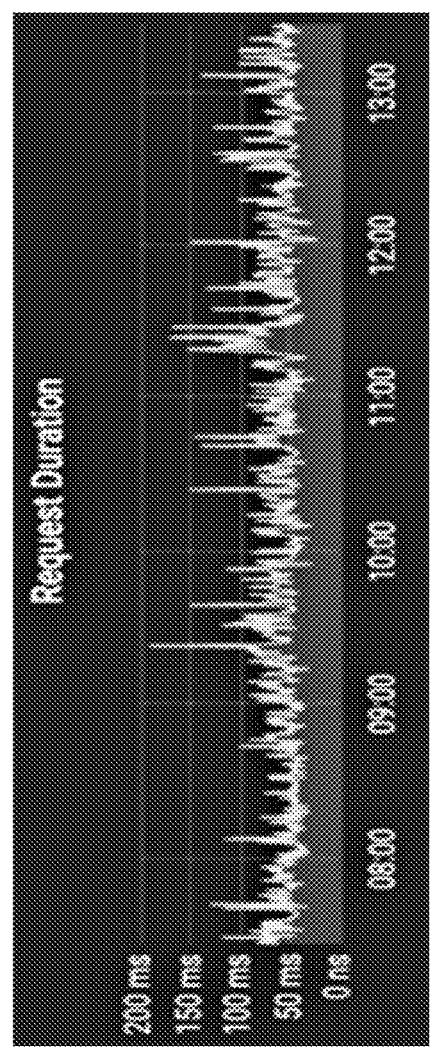
Figure 5C:
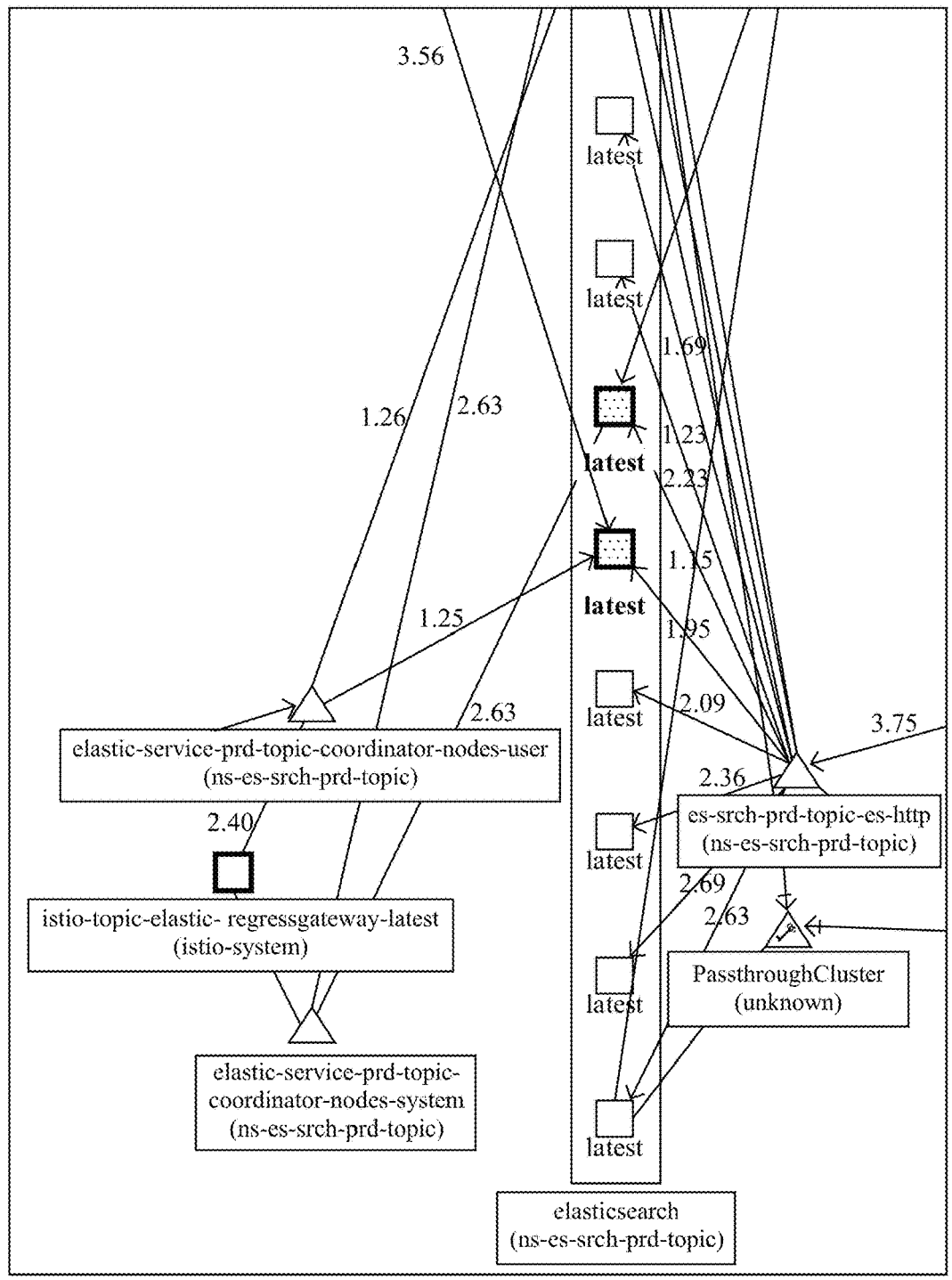
Figure 5D:
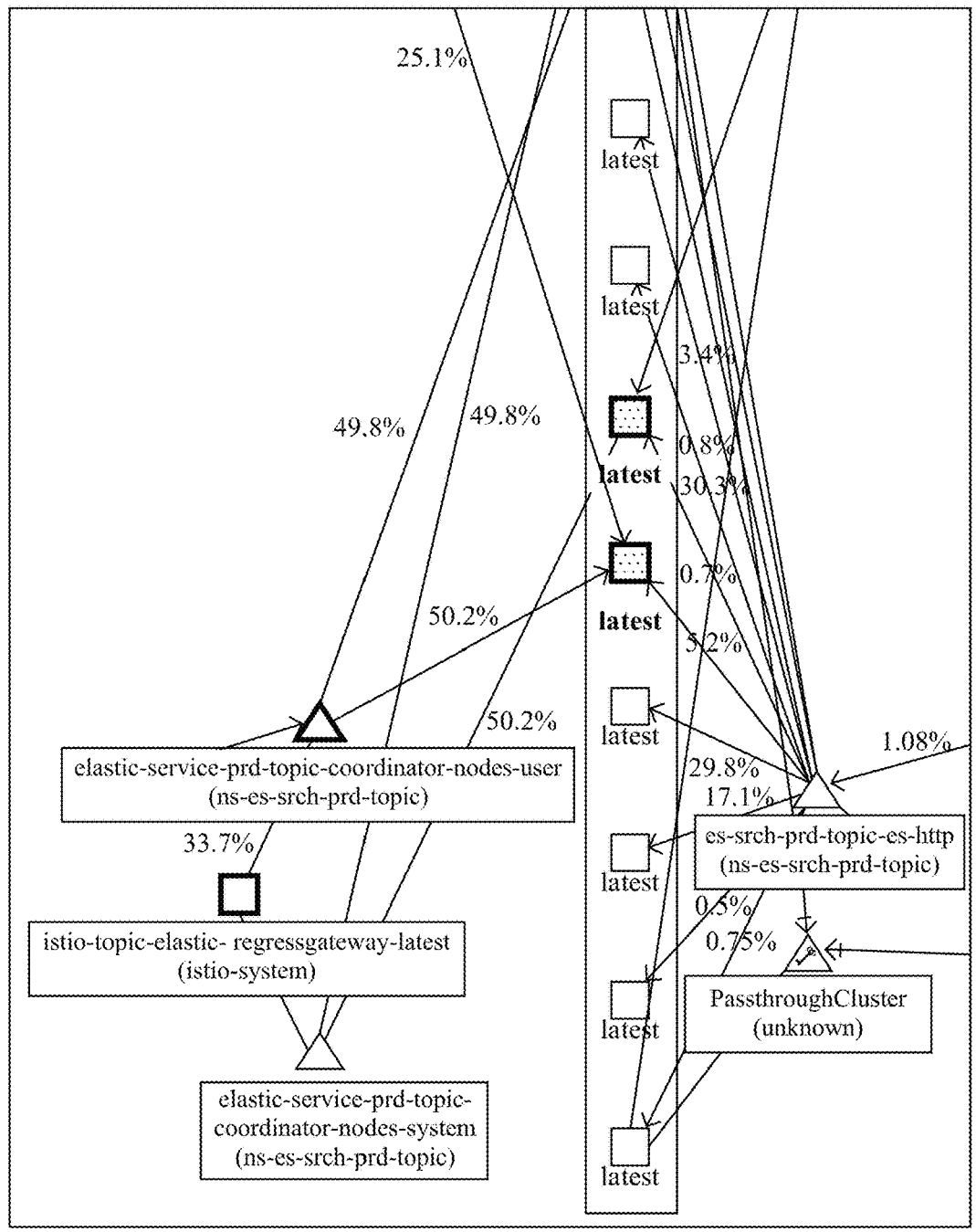

Notably, FIGS. 5A-5D illustrate example user interfaces according to the obtained observability data as described herein. For instance, FIG. 5A illustrates an example timeline 510 of incoming request size by source, and FIG. 5B illustrates an example timeline 520 regarding request duration. Other types of graphical arrangements may be made, such as shown in FIG. 5C where a connectivity diagram 530 illustrates average requests per second, or in FIG. 5D where another connectivity diagram 540 illustrates request volume distribution. Other observability data, metrics, etc., can be shown in corresponding imagery, such as request latencies, incoming requests by source and response code, incoming success rate by source, incoming request duration by source, incoming request volume, incoming success rate, and so on. The views shown in FIGS. 5A-5D are thus merely examples for illustration of the concepts herein.

According to further embodiments of the present disclosure, an artificial intelligence (AI) agent may be used herein to provide an advanced configuration system that is designed to create dynamic configurations for the eco-system of ingestion aimed towards increased efficiency of indexing documents of various sizes. An AI agent herein, therefore, may act like a centralized AI-based decision making system, which receives real-time telemetry signals like pipeline throughput for document ingestion, Kubernetes microservices scale (number of pods per pipeline), resource (CPU/memory) utilization, network metric information retrieved by observability platforms from the Kubernetes cluster for the microservices, number of events that are pending to be processed in each of the pub-sub queues for each of pipelines, number of unique tokens per documents, size of the documents, average ingestion latency per document per pipeline, network quality of service, ingestion failure/retry counts etc and analyses this data and makes decisions and steps to optimize the overall ingestion eco-system like generating effective indexing configurations, spinning up new pipelines dynamically to cater to different size bucket ranges for optimal ingestion throughput.

Illustratively, the AI Agent herein may utilize an Artificial Intelligence Markup Language (AIML) predictive model that is generated from historical indexing data such as elastic telemetry data, network quality of service, number of tokens, number of documents, failure rate, success rate, latency, document processing time, waiting time in queue, among other data sources. This data may then be used to create a predictive model that can analyze the data and generate effective indexing configurations for different types of documents.

Based on the recommendations generated by the predictive model, the AI agent may automatically orchestrate the initiation of new steps which could include the following:

1. Create new ingestion (Pub/Sub) topic/subscriptions with new bucket size range allocation and adjusts ones from current Pub/Sub subscriptions.
2. Provision new infrastructure with optimal (CPU/RAM) configurations to cater to the processing of new size bucket range of documents as well as for the microservices for document processing and ingestion (e.g., logstash) etc.
3. Scale down of infrastructure for existing pipelines as needed for optimal processing of documents and ingestion.
4. Dynamic configuration generation for ingestion services with most optimal settings for that document size category.
5. Dynamic deployment of these microservices for document processing and ingestion (e.g., logstash).
6. Dynamic increase/decrease in the scale of the pods for microservices in GKE per pipeline.

The AI Agent centralized system herein may create a Pub/Sub and logstash configuration that ensures that documents are indexed in the most optimal and fastest way possible. For instance, the system may filter smaller documents and push them to faster-moving queues, while bulkier documents are directed to slower queues. This ensures that all documents are indexed quickly and efficiently, without overwhelming the system.

The AI agent is an essential tool for businesses and organizations that need to index large volumes of documents quickly and efficiently. This system is highly effective because it is capable of analyzing data from various sources, and generating effective indexing configurations that can handle different types of documents. This saves troubleshooting time and efforts of the operations team. Not only that, organizations can save their infrastructure cost and cost of operations, as the configurations ensure optimal use of resources. That is, with the AI Agent, organizations can be assured of fast and efficient indexing of their documents, which is essential for effective data management and searching. This will ensure better customer satisfaction as the number of support incidents will reduce, owing to fewer errors and incidents of data loss.

Figure 6:
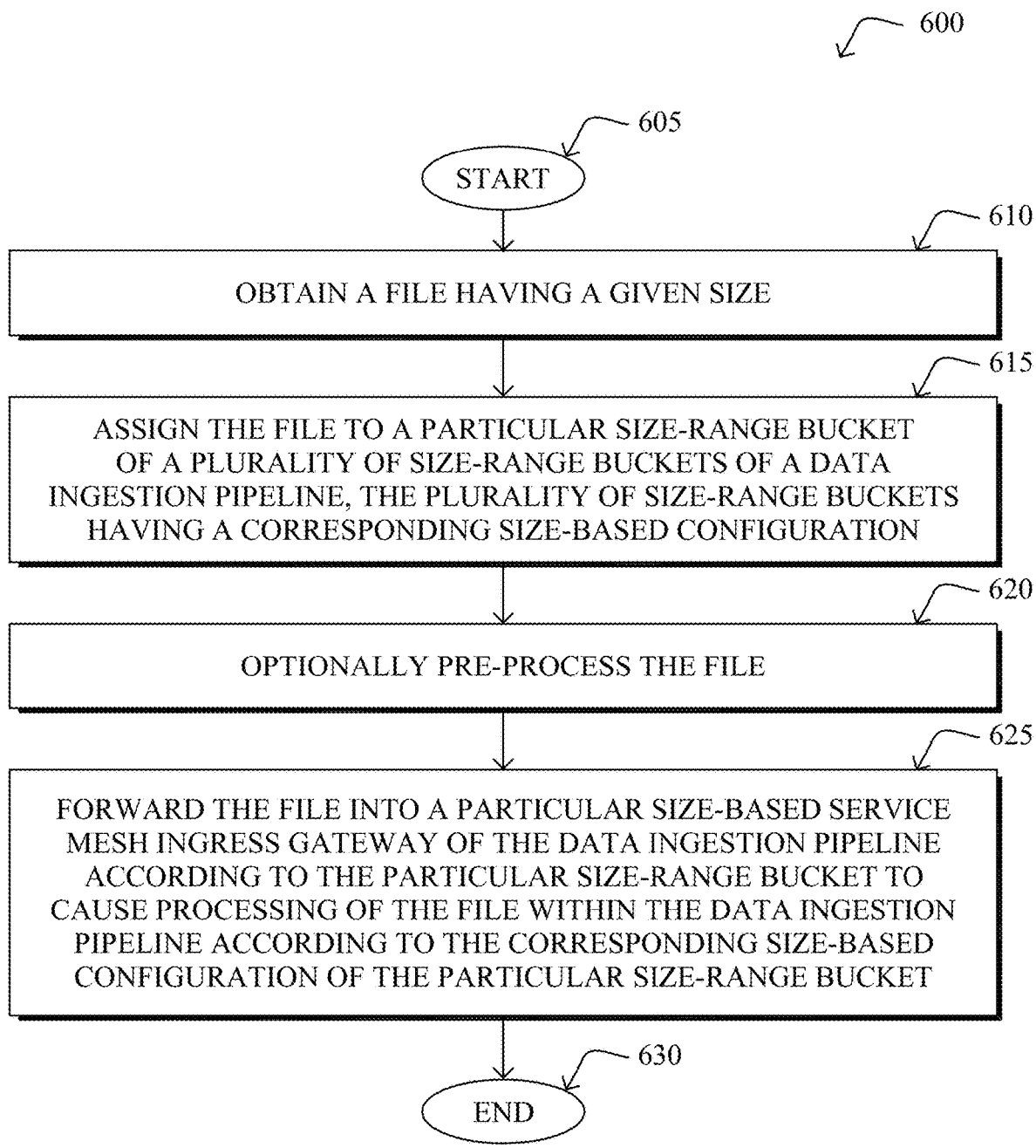
FIG. 6 illustrates an example simplified procedure for optimized dynamic large scale and large document ingestion for search engines using service mesh in accordance with one or more embodiments described herein.

In closing, FIG. 6 illustrates an example simplified procedure for optimized dynamic large scale and large document ingestion for search engines using service mesh in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the system herein obtains a file having a given size, such that in step 615, the system then assigns the file to a particular size-range bucket of a plurality of size-range buckets of a data ingestion pipeline, the plurality of size-range buckets having a corresponding size-based configuration. Optionally, in step 620, the techniques herein may pre-process the file (e.g., an aggregation of a plurality of files). Then, in step 625, the system forwards the file into a particular size-based service mesh ingress gateway of the data ingestion pipeline according to the particular size-range bucket to cause processing of the file within the data ingestion pipeline according to the corresponding size-based configuration of the particular size-range bucket.

The simplified procedure 600 may then end in step 630, notably with the ability to continue obtaining and appropriately forwarding files. Other steps may also be included generally within procedure 600. For example, such steps (or, more generally, such additions to steps already specifically illustrated above), may include: monitoring file traffic of the data ingestion pipeline and deriving observability data based on the file traffic of the data ingestion pipeline; tuning the corresponding size-based configuration of the plurality of size-range buckets based on applying machine learning to the observability data; annotating the file according to the particular size-range bucket and pushing the file to a cloud storage publish/subscribe messaging topic; and so on.

It should be noted that while certain steps within procedures 300 and 600 may be optional as described above, the steps shown in FIGS. 3 and 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 300 and 600 are described separately, certain steps from each procedure may be incorporated into each other procedure, and the procedures are not meant to be mutually exclusive.

The techniques described herein, therefore, provide for optimized dynamic large scale and large document ingestion for search engines using service mesh. In particular, the techniques herein establish a multi-pipeline architecture that is based on file size and uses service mesh (e.g., for an enterprise search scenario, or otherwise) that allows the use of larger file sizes (e.g., allowing more data within a single document for more relevant searching). This is particularly beneficial, for instance, where approximately 90% of product support cases are solved by technical support teams by using topic searches through large documents (e.g., product notes, bug reports, etc.). Notably, the techniques herein provide a parallelism in processing and significantly reduces the cost of the processing and the responsiveness of the overall search system, particularly through the use of service mesh for search purposes and following the principles of queuing theory. The techniques herein also provide for optimized configuration setting, which may be further enhanced with machine learning and artificial intelligence techniques to provide intuitive tuning, as may be appreciated by those skilled in the art.

Illustratively, the techniques described herein may be performed by hardware, software, and/or firmware, such as in accordance with the illustrative optimized ingestion and search process 248, which may include computer executable instructions executed by the processor 220 to perform functions relating to the techniques described herein, e.g., in conjunction with corresponding processes of other devices in the computer network as described herein (e.g., on controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, by a process, a file having a given size; assigning, by the process, the file to a particular size-range bucket of a plurality of size-range buckets of a data ingestion pipeline, the plurality of size-range buckets having a corresponding size-based configuration; and forwarding, by the process, the file into a particular size-based service mesh ingress gateway of the data ingestion pipeline according to the particular size-range bucket to cause processing of the file within the data ingestion pipeline according to the corresponding size-based configuration of the particular size-range bucket.

In one embodiment, the method further comprises: pre-processing the file prior to forwarding the file. In one embodiment, pre-processing comprises an aggregation of a plurality of files.

In one embodiment, the plurality of size-range buckets each correspond to separate service mesh ingress gateway and a corresponding cloud platform internal load balancer to a particular instance of a distributed search and analytics engine.

In one embodiment, the corresponding size-based configuration of the plurality of size-range buckets are based on smaller-sized buckets managing a larger number of smaller-sized files with lower processing and memory resources than larger-sized buckets that manage a smaller number of larger-sized files with higher processing and memory resources.

In one embodiment, the method further comprises: monitoring file traffic of the data ingestion pipeline; and deriving observability data based on the file traffic of the data ingestion pipeline. In one embodiment, the observability data comprises one or more of: sizes of files; a percentage of distribution of file sizes; incoming request durations for connections for document ingestion; server responses and their HTTP Codes for document ingestion; server incoming request volume; average response time for requests; number of requests per second across microservices; and nodes used for document ingestion; or errors. In one embodiment, the method further comprises: tuning the corresponding size-based configuration of the plurality of size-range buckets based on applying machine learning to the observability data.

In one embodiment, the method further comprises: annotating the file according to the particular size-range bucket.

In one embodiment, annotating adds a cloud storage publish/subscribe message attribute, and the method further comprises: pushing the file to a cloud storage publish/subscribe messaging topic. In one embodiment, one or more subscription filters of the data ingestion pipeline are configured to filter files based on the cloud storage publish/subscribe message attribute to cause an appropriate size-based service mesh ingress gateway to process the file.

In one embodiment, the corresponding size-based configuration comprises processor and memory specifications.

In one embodiment, the corresponding size-based configuration comprises one or more of: file batch sizes, number of files within a given batch, timeout, or worker threads.

In one embodiment, the corresponding size-based configuration comprises one or more of pod replica configurations or horizontal pod autoscaler configurations.

In one embodiment, the method further comprises: implementing an artificial intelligence agent to dynamically configure ingestion of files to increase efficiency of indexing files based on file sizes.

According to the embodiments herein, an illustrative A tangible, non-transitory, computer-readable medium having computer-executable instructions stored thereon that, when executed by a processor on a computer, cause the computer to perform a method comprising: obtaining a file having a given size; assigning the file to a particular size-range bucket of a plurality of size-range buckets of a data ingestion pipeline, the plurality of size-range buckets having a corresponding size-based configuration; and forwarding the file into a particular size-based service mesh ingress gateway of the data ingestion pipeline according to the particular size-range bucket to cause processing of the file within the data ingestion pipeline according to the corresponding size-based configuration of the particular size-range bucket.

Further, according to the embodiments herein an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: obtain a file having a given size; assign the file to a particular size-range bucket of a plurality of size-range buckets of a data ingestion pipeline, the plurality of size-range buckets having a corresponding size-based configuration; and forward the file into a particular size-based service mesh ingress gateway of the data ingestion pipeline according to the particular size-range bucket to cause processing of the file within the data ingestion pipeline according to the corresponding size-based configuration of the particular size-range bucket.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, applications, tools, and associated devices have been shown, such as Elasticsearch, Logstash, Istio, and so on, other suitable technologies, protocols, applications, tools, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, by a process, a file having a given size;
   assigning, by the process, the file to a particular size-range bucket of a plurality of size-range buckets of a data ingestion pipeline, the plurality of size-range buckets having a corresponding size-based configuration; and
   forwarding, by the process, the file into a particular size-based service mesh ingress gateway of the data ingestion pipeline according to the particular size-range bucket to cause processing of the file within the data ingestion pipeline according to the corresponding size-based configuration of the particular size-range bucket.

2. The method as in claim 1, further comprising:
   pre-processing the file prior to forwarding the file.

3. The method as in claim 2, wherein pre-processing comprises an aggregation of a plurality of files.

4. The method as in claim 1, wherein the plurality of size-range buckets each correspond to separate service mesh ingress gateway and a corresponding cloud platform internal load balancer to a particular instance of a distributed search and analytics engine.

5. The method as in claim 1, wherein the corresponding size-based configuration of the plurality of size-range buckets are based on smaller-sized buckets managing a larger number of smaller-sized files with lower processing and memory resources than larger-sized buckets that manage a smaller number of larger-sized files with higher processing and memory resources.

6. The method as in claim 1, further comprising:
   monitoring file traffic of the data ingestion pipeline; and
   deriving observability data based on the file traffic of the data ingestion pipeline.

7. The method as in claim 6, wherein the observability data comprises one or more of: sizes of files; a percentage of distribution of file sizes; incoming request durations for connections for document ingestion; server responses and their HTTP Codes for document ingestion; server incoming request volume; average response time for requests; number of requests per second across microservices; and nodes used for document ingestion; or errors.

8. The method as in claim 6, further comprising:
   tuning the corresponding size-based configuration of the plurality of size-range buckets based on applying machine learning to the observability data.

9. The method as in claim 1, further comprising:
   annotating the file according to the particular size-range bucket.

10. The method as in claim 9, wherein annotating adds a cloud storage publish/subscribe message attribute, the method further comprising:
    pushing the file to a cloud storage publish/subscribe messaging topic.

11. The method as in claim 10, wherein one or more subscription filters of the data ingestion pipeline are configured to filter files based on the cloud storage publish/subscribe message attribute to cause an appropriate size-based service mesh ingress gateway to process the file.

12. The method as in claim 1, wherein the corresponding size-based configuration comprises processor and memory specifications.

13. The method as in claim 1, wherein the corresponding size-based configuration comprises one or more of: file batch sizes, number of files within a given batch, timeout, or worker threads.

14. The method as in claim 1, wherein the corresponding size-based configuration comprises one or more of pod replica configurations or horizontal pod autoscaler configurations.

15. The method as in claim 1, further comprising:
    implementing an artificial intelligence agent to dynamically configure ingestion of files to increase efficiency of indexing files based on file sizes.

16. A tangible, non-transitory, computer-readable medium having computer-executable instructions stored thereon that, when executed by a processor on a computer, cause the computer to perform a method comprising:
    obtaining a file having a given size;
    assigning the file to a particular size-range bucket of a plurality of size-range buckets of a data ingestion pipeline, the plurality of size-range buckets having a corresponding size-based configuration; and
    forwarding the file into a particular size-based service mesh ingress gateway of the data ingestion pipeline according to the particular size-range bucket to cause processing of the file within the data ingestion pipeline according to the corresponding size-based configuration of the particular size-range bucket.

17. The tangible, non-transitory, computer-readable medium as in claim 16, wherein the plurality of size-range buckets each correspond to separate service mesh ingress gateway and a corresponding cloud platform internal load balancer to a particular instance of a distributed search and analytics engine.

18. The tangible, non-transitory, computer-readable medium as in claim 16, wherein the corresponding size-based configuration of the plurality of size-range buckets are based on smaller-sized buckets managing a larger number of smaller-sized files with lower processing and memory resources than larger-sized buckets that manage a smaller number of larger-sized files with higher processing and memory resources.

19. The tangible, non-transitory, computer-readable medium as in claim 16, wherein the method further comprises:
    monitoring file traffic of the data ingestion pipeline; and
    deriving observability data based on the file traffic of the data ingestion pipeline.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:
obtain a file having a given size;
assign the file to a particular size-range bucket of a plurality of size-range buckets of a data ingestion pipeline, the plurality of size-range buckets having a corresponding size-based configuration; and
forward the file into a particular size-based service mesh ingress gateway of the data ingestion pipeline according to the particular size-range bucket to cause processing of the file within the data ingestion pipeline according to the corresponding size-based configuration of the particular size-range bucket.

* * * * *